(12) United States Patent
Bruna Estrach

(10) Patent No.: US 8,368,809 B2
(45) Date of Patent: Feb. 5, 2013

(54) FRAME RATE CONVERSION WITH MOTION ESTIMATION IN A PLURALITY OF RESOLUTION LEVELS

(75) Inventor: Joan Bruna Estrach, Paris (FR)

(73) Assignee: Zoran (France), Paris (FR)

( * ) Notice: Subject to any disclaimer, the term of this patent is extended or adjusted under 35 U.S.C. 154(b) by 273 days.

(21) Appl. No.: 12/921,488

(22) PCT Filed: Mar. 18, 2008

(86) PCT No.: PCT/IB2008/052204
§ 371 (c)(1),
(2), (4) Date: Sep. 8, 2010

(87) PCT Pub. No.: WO2009/115867
PCT Pub. Date: Sep. 24, 2009

(65) Prior Publication Data
US 2011/0096227 A1    Apr. 28, 2011

(51) Int. Cl.
*H04N 17/01* (2006.01)
(52) U.S. Cl. ....................................................... 348/441
(58) Field of Classification Search .................. 348/441, 348/448, 452, 458, 459, 445, 449, 451
See application file for complete search history.

(56) References Cited

U.S. PATENT DOCUMENTS

| | | | |
|---|---|---|---|
| 6,317,136 B1 | 11/2001 | Choi | |
| 7,116,372 B2 * | 10/2006 | Kondo et al. | 348/448 |
| 7,586,540 B2 * | 9/2009 | Ogino et al. | 348/448 |
| 8,098,327 B2 * | 1/2012 | Yamauchi | 348/441 |
| 8,130,837 B2 * | 3/2012 | Heyward | 375/240.16 |
| 8,134,640 B2 * | 3/2012 | Doswald | 348/441 |
| 8,194,184 B2 * | 6/2012 | Turetken et al. | 348/441 |
| 2003/0123550 A1 * | 7/2003 | Wang et al. | 375/240.16 |
| 2010/0220783 A1 * | 9/2010 | Mallat et al. | 375/240.03 |

FOREIGN PATENT DOCUMENTS

| | | |
|---|---|---|
| GB | 2435360 A | 8/2007 |
| WO | 2006030400 A | 3/2006 |

OTHER PUBLICATIONS

Zhenyu L. et al. "32-Parallel SAD Tree Hardwired Engine for Variable Block Size Motion Estimation in HDTV1080P Real-Time Encoding Application", Proceedings of the 2007 IEEE Workshop on Signal Processing Systems, Oct. 17, 2007, pp. 675-680.

Joseph Weber et al., "Robust Computation of Optical Flow in a Multi-Scale Differential Framework", International Journal of Computer Vision, 1994, 2, pp. 5-19.

(Continued)

*Primary Examiner* — Paulos M Natnael
(74) *Attorney, Agent, or Firm* — Lando & Anastasi, LLP

(57) ABSTRACT

Multiscale coefficients for each input video frame are distributed into K>1 groups. A first group of coefficients provides a representation of the frame at a first resolution level. For each integer k ($1<k\leq K$), a $k^{th}$ group of coefficients and the representation of the frame at the (k−i)th resolution level determine a representation of the frame at a $k^{th}$ resolution level. Directions of regularity (motion vectors) are associated with output pixels based on representations of successive input frames at one or more of the resolution levels. An interpolated pixel value is determined for the output pixel using each direction of regularity (motion vector) associated with this pixel by interpolating between pixel values from representations of successive input frames at one or more of the resolution levels. A direction of regularity (motion vector) is taken into account using representations of the successive frames of the input video sequence at one or more of the resolution levels depending on this direction of regularity (motion vector).

25 Claims, 9 Drawing Sheets

OTHER PUBLICATIONS

Yue W. et al, "A Novel Parallel Fast Motion Estimation Algorithm", Proceedings of the 2005 International Conference on Intelligent Sensing and Information Processing, Jan. 4, 2005, pp. 378-381.

International Search Report and Written Opinion in corresponding International Application No. PCT/IB2008/052204 dated Jul. 16, 2009.

* cited by examiner

FRAME RATE CONVERSION WITH MOTION ESTIMATION IN A PLURALITY OF RESOLUTION LEVELS

BACKGROUND OF THE INVENTION

The present invention relates to digital video processing, and in particular to frame rate conversion.

In a number of video applications, it is necessary to change the frame rate of a digital video sequence. This requires some form of interpolation in time between successive frames of the sequence. A standard way to perform frame rate conversion (FRC) includes detecting a structure of the video in the form of local motion vectors or sets of local directions of regularity in image contexts. Depending on the local structure that has been detected, the frame rate converter computes interpolated pixels.

A multiscale hierarchical motion estimation method is disclosed in "Hierarchical Model-Based Motion Estimation", J. R. Bergen, et al., Proceedings of the $2^{nd}$ European Conference on Computer Vision, May 1992, pages 237-252. Multiscale differential motion estimation methods are disclosed in "Bayesian Multi-Scale Differential Optical Flow", E. P. Simoncelli, Handbook of Computer Vision and Applications, Vol. 2, chapter 14, Academic Press, San Diego, April 1999, pages 397-422, and in "Robust computation of optical flow in a multi-scale differential framework", J. Weber and J. Malik, International Journal of Computer Vision, Vol. 2, 1994, pages 5-19.

All these methods allow to perform frame rate conversion based on motion compensation using a multiscale estimation method, and to provide a dense motion map at the final pixel or subpixel resolution. The accuracy of the motion estimation is not related to the needs of the interpolation process applied to perform frame rate conversion.

A frame rate converter is commonly implemented in an application-specific integrated circuit (ASIC) or a field-programmable gate array (FPGA). In such components, the internal memory is normally not large enough to store two full-resolution images. The processing is done in an order prescribed by the input and output interfaces of the FRC circuit, usually raster, striped or tiled. At any given time, the chip holds in memory a context of lines for doing the structure detection, and for computing interpolated pixel values.

A hard limitation affects most prior art FRC systems: supporting a range of vertical speeds or displacements $[-V_y, V_y]$ between consecutive frames requires buffers covering more than $2 \times V_y + 1$ lines for each input frame. In addition the size of the logic required to handle with good visual quality a large range of speeds increases sharply with the range.

There is a need for an implementation of FRC processing with a good trade-off between quality of the converted video sequence and (i) cost of a hardware implementation in terms of internal memory and logic size of the component or (ii) complexity of a software implementation. Such need is particularly acute in the case of real-time applications of FRC.

SUMMARY OF THE INVENTION

The invention thus proposes a method of converting the frame rate of a video sequence, comprising:

distributing multiscale coefficients obtained for each frame of an input video sequence into K groups of coefficients, K being an integer greater than 1, whereby a first group of coefficients provides a representation of the frame at a first resolution level and for each integer k such that $1 < k \leq K$, a $k^{th}$ group of coefficients and the representation of the frame at the $(k-1)^{th}$ resolution level determine a representation of the frame at a $k^{th}$ resolution level;

determining directions of regularity associated with pixels of at least one frame of an output video sequence based on representations of successive frames of the input video sequence at at least one of the resolution levels; and determining an interpolated pixel value for each pixel of said frame of the output video sequence, the determination of the interpolated pixel value including, for each direction of regularity associated with said pixel, interpolating between pixel values from representations of successive frames of the input video sequence at at least one of the resolution levels.

Advantageously, when considering a direction of regularity in at least one of the steps of determining directions of regularity and of determining interpolated pixel values, representations of the successive frames of the input video sequence are used at at least one resolution level depending on said direction of regularity.

Typically, the raster order is used to generate the frame rate-converted output pixels. The interpolated pixel values are then determined in succession along lines of the frame of the output video sequence, and the aforesaid representations of the successive frames of the input video sequence are used at at least one resolution level depending on a temporal slope of said direction of regularity along a spatial dimension transverse to the lines.

This provides a trade-off between the amount of vertical speeds of objects that can be taken into account by the processing, and the cost of implementation. In certain embodiments, different ranges of horizontal speed can also be accounted for.

In an embodiment, determining an interpolated pixel value for a pixel of the output video sequence includes, for each direction of regularity associated with said pixel, interpolating between pixel values from the representations of successive frames of the input video sequence at a resolution level depending on said direction of regularity.

In another embodiment, which may or may not be combined with the previous one, determining directions of regularity associated with a pixel of a frame of the output video sequence comprises:

estimating a respective loss value for each of a plurality of candidate directions, based on said candidate direction and on local representations of successive frames of the input video sequence at a resolution level depending on said candidate direction; and selecting directions of regularity among the plurality of candidate directions based on the estimated loss values.

The aforesaid plurality of candidate directions can be taken from sets of candidate directions respectively associated with different resolution levels and covering separate, or split, ranges of directions of regularity. The spacing between the candidate directions of one of the sets is preferably a decreasing function of the resolution level associated with this set. The loss value for a candidate direction of one of the sets is then estimated using local representations of the frames at the resolution level associated with this set.

Alternatively, in a "nested" embodiment, sets of candidate directions respectively associated with different resolution levels are defined to cover different ranges of directions of regularity such that the range covered by each set associated with a first resolution level is embedded in the range covered by any set associated with a second resolution level lower than said first resolution level. The spacing between the candidate directions of one of the sets can also be a decreasing function of the resolution level associated with said set. Determining directions of regularity associated with a pixel of a frame of the output video sequence then includes:

for each of the different resolution levels, estimating a respective loss value for each candidate direction of the set associated with said resolution level, based on said candidate direction and on local representations of successive frames of the input video sequence at said resolution level; and selecting directions of regularity among the candidate directions based on the estimated loss values.

In the "nested" embodiment, selecting directions of regularity among the candidate directions may comprise eliminating candidate directions having an estimated loss value above a threshold, and keeping each remaining candidate direction of the set associated with a first resolution level higher than a second resolution level if a candidate direction of the set associated with said second resolution level equal or closest to said candidate direction of the set associated with the first resolution level remains.

The invention provides flexibility in the adaptation of the resolution levels in one or more sections of a frame rate converter. In the above-disclosed embodiments, the adaptation is typically made depending on the temporal slope of the directions of regularity along one or more dimension, in particular the vertical speeds of moving objects. Another possibility, which may be provided for in such embodiments or separately, is to make use of different resolution levels in different parts of the frame rate converter.

In particular, it is possible, for at least some directions of regularity, that the step of determining directions of regularity involves representations of successive frames of the input video sequence at at least one resolution level different from the resolution level of the representations of the successive frames of the input video sequence used for interpolating between pixel values for said directions of regularity.

Another aspect of the invention relates to a computer program product, comprising instructions to carry out a frame rate conversion method as outlined above when said program product is run in a computer processing unit.

Still another aspect of the invention relates to an FRC device comprising:

a line buffer section for storing multiscale coefficients for representing locally successive frames of an input video sequence about a current line of an output video sequence, the stored multiscale coefficients being distributed into K groups of coefficients, K being a integer greater than 1, whereby a first group of coefficients provides a representation of a first frame region at a first resolution level, and for each integer k such that $1 < k \leq K$, a $k^{th}$ group of coefficients and the representation of the $(k-1)^{th}$ frame region at the $(k-1)^{th}$ resolution level determine a representation of a $k^{th}$ frame region at a $k^{th}$ resolution level, the $k^{th}$ frame region being included in the $(k-1)^{th}$ frame region;

a geometry detection section having access to the line buffer section to determine directions of regularity associated with pixels of said current line based on pixel values from said representations of frame regions in successive frames of the input video sequence;

an interpolation section having access to the line buffer section to determine an interpolated pixel value for each pixel of said current line, the determination of the interpolated pixel value including, for each direction of regularity associated with said pixel, interpolating between pixel values from said representations of frame regions in successive frames of the input video sequence At least one of the geometry detection and interpolation sections is arranged to take into account a direction of regularity using representations of frame regions in the successive frames of the input video sequence at at least one resolution level depending on said direction of regularity.

In an embodiment, the resolution level depends on a temporal slope of said direction of regularity along a spatial dimension transverse to the lines of the output video sequence. Preferably, for each integer k such that $1 < k \leq K$, the $k^{th}$ frame region is smaller than the $(k-1)^{th}$ frame region along said spatial dimension.

For the operation of the interpolation section, a plurality of interpolation intervals can be defined for the temporal slopes of the directions of regularity along said spatial dimension. The interpolation section then has a plurality of interpolators each associated with a respective resolution level and with a respective interpolation interval for interpolating between pixel values from the representations of frame regions at this resolution level using directions of regularity having temporal slopes within this interpolation interval along said spatial dimension.

In such an embodiment of the FRC device, the geometry detection section may have a single detector for estimating respective loss values for pixels of the current line and for candidate directions based on said candidate directions and on the representations of frame regions at one resolution level, and a selector for selecting directions of regularity for the pixels of the current line among the candidate directions based on the estimated loss values.

Alternatively, a plurality of detection intervals are defined for the temporal slopes of the directions of regularity along said spatial dimension, and the geometry detection section has:

a plurality of detectors each associated with a respective resolution level and with a respective detection interval, for estimating respective loss values for pixels of the current line and for candidate directions having temporal slopes within said detection interval along said spatial dimension based on said candidate directions and on the representations of frame regions at said resolution level; and a selector for selecting directions of regularity for the pixels of the current line among the candidate directions based on the estimated loss values.

Each of the detectors associated with a resolution level and with a detection interval may be arranged for estimating loss values for candidate directions belonging to a set of candidate directions associated with said resolution level. The loss value for a pixel of the current line and a candidate direction of one of the sets is then estimated using local representations of the frames at the resolution level associated with said set.

In a "split" embodiment, the sets of candidate directions associated with different resolution levels cover separate temporal slope ranges of the candidate directions along said spatial dimension.

Alternatively, in a "nested" embodiment, the sets of candidate directions associated with different resolution levels cover different temporal slope ranges of the candidate directions along said spatial dimension such that the temporal slope range covered by each set associated with a first resolution level is embedded in the temporal slope range covered by any set associated with a second resolution level lower than said first resolution level. The selector is then arranged to eliminate from the directions of regularity candidate directions having an estimated loss value above a threshold, and to select as a direction of regularity each remaining candidate direction of the set associated with a first resolution level higher than a second resolution level if a candidate direction of the set associated with said second resolution level equal or closest to said candidate direction of the set associated with the first resolution level was not eliminated.

For at least some directions of regularity, the geometry detection section may use representations of frame regions of the input video sequence at at least one resolution level different from the resolution level of the representations of the frame regions used in the interpolation section for interpolating between pixel values for said directions of regularity.

BRIEF DESCRIPTION THE DRAWINGS

The foregoing and other objects of this invention, the various features thereof, as well as the invention itself, may be more fully understood from the following description, when read together with the accompanying drawings in which.

DESCRIPTION OF PREFERRED EMBODIMENTS

Figure 1:
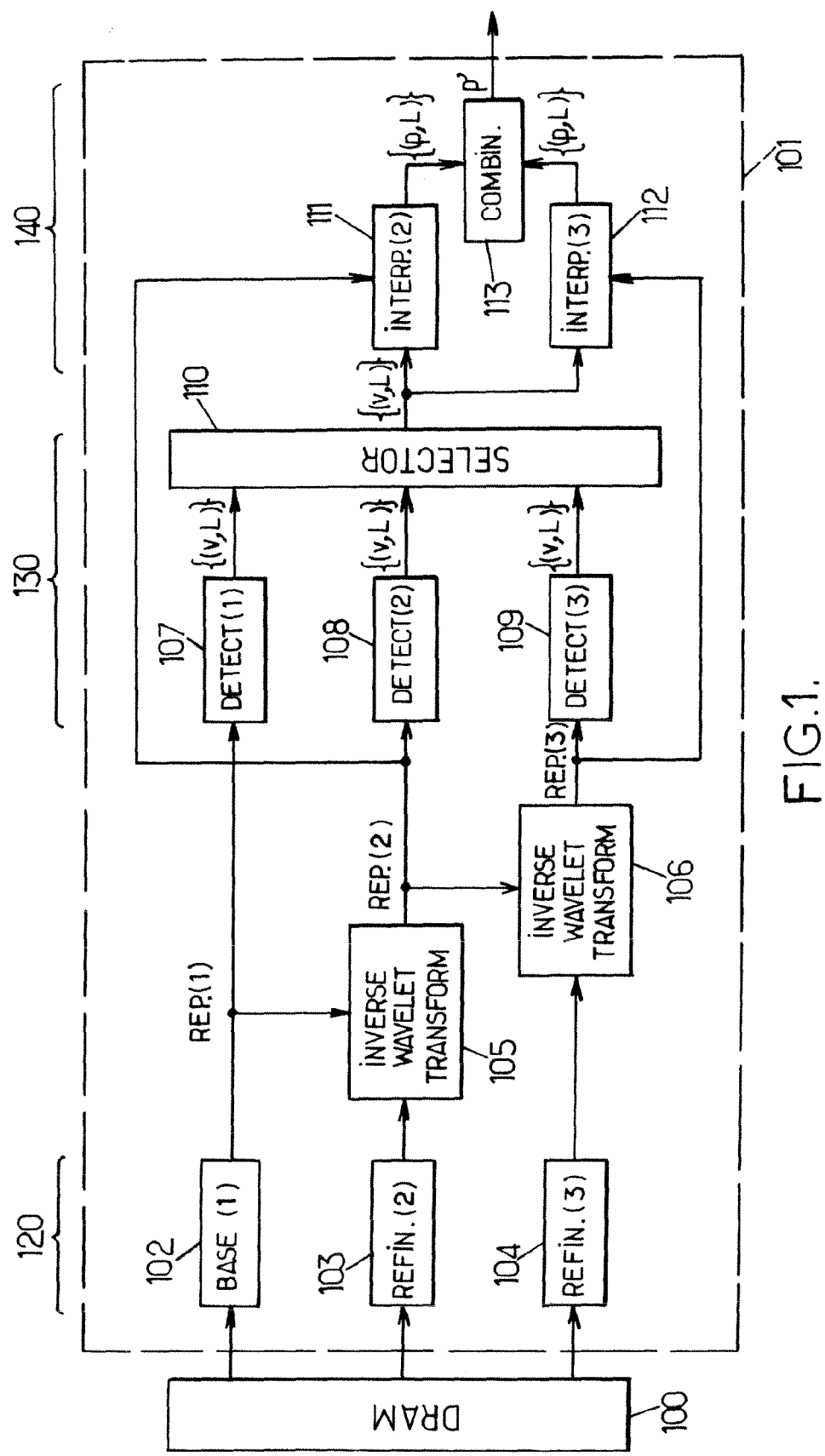
FIG. 1 is a block diagram of an embodiment of an FRC device.

A video signal is denoted $I_t(x)$, where t is a scalar temporal index and x is a 2-dimensional spatial index: $x=(x_1, x_2)$. The video signal is made of pixels taking values in scalar or vector form. For color video, the pixels take 3-dimensional values. Common bases are RGB (red, green, blue) and YUV. In the exemplary embodiments below, we will consider components YUV in a non-limiting manner. The video $I_t(x)$ in a YUV basis then has a luma component $Y_t(x)$ and two chroma components $U_t(x)$ and $V_t(x)$. To designate indistinctively one of the three channels Y, U and V, the notation $C_t(x)$ is also used.

A frame channel, namely an image with one-dimensional pixel values, can be decomposed using a discrete wavelet transform. Using common conventions:
- a pixel representation of an image is referred to as a representation with a resolution index $j=0$;
- one step of a discrete wavelet transform of the pixel image made of N pixels provides N coefficients with a resolution index $j=-1$ that are distributed into two categories, namely N/4 scaling coefficients with the resolution index $j=-1$ (also coined father wavelet coefficients in the literature) and 3N/4 wavelet coefficients with the resolution index $j=-1$. The scaling coefficients with the resolution index $j=-1$ form a low-resolution approximation $I_{-1,t}(x)$ of the original pixel array, with a resolution in both directions $x_1$ and $x_2$ reduced by a factor 2;
- the wavelet transform can be further applied to the N/4 scaling coefficients of resolution index $j=-1$ to obtain N/16 scaling coefficients forming a low-resolution approximation $I_{-2,t}(x)$ of the original pixel array with a resolution index $j=-2$, and 3N/16 wavelet coefficients with the resolution index $j=-2$, etc.

The notation $C_{j,t}(x)$ is used for the scaling coefficients corresponding to the signal component $C_t(x)$ with a resolution index j.

A direction of regularity of a video block at a pixel location (x, t) denotes a spatio-temporal direction (dx, dt) along which the video has small variations. Such a direction of regularity is for example detected by evaluating a directional cost of the form:

$$E(dx, dt) = \sum_{(x',t') \in w} |C_{t'+dt}(x' + dx) - C_{t'}(x')| \quad (1)$$

for different candidate directions (dx, dt), where w is a window centered on the pixel (x, t), and retaining the directions for which the cost is minimum. A window w centered on pixel (x, t) spans for example the indexes x+(u, v) such that $-w_1<u<w_1$ and $-w_2<v<w_2$ for some integers $w_1$ and $w_2$ and for frame t and optionally one or more preceding and/or following frames.

In addition, a direction of regularity can be evaluated based on a low-resolution approximation $I_{j,t}(x)$ of the video signal, i.e. with a resolution index $j<0$, in which case formula (1) is scaled accordingly:

$$E_j(dx, dt) = N_j \sum_{(x',t') \in w} |C_{j,t'+dt}(x' + 2^j \cdot dx) - C_{j,t'}(x')| \quad (2)$$

where w is a window centered around $(2^j \cdot x, t)$, and of size depending on j, and $N_j$ is a weighting factor. When $j=0$, (2) reduces to (1). It is possible to consider all integer values of a vector dx, or only those that are a multiple of the integer $2^{-j}$, in which case the candidate directions are more widely spaced apart.

An exemplary embodiment of an FRC device is depicted in FIG. 1. The FRC processing circuit 101 has various elements including line buffers and processing modules which may be incorporated into a hardware device such as an ASIC or an FPGA as is common practice in the art. Circuit 101 reads digital video frames from a frame store embodied in an external memory device 100 for example of the DRAM type (dynamic random access memory). It reads pixel data from at least two frames corresponding to consecutive time indexes t and t+1. The frame pixel information is represented using multiresolution coefficients, e.g. wavelet coefficients that are stored temporally in a line buffer section 102-104.

A layered structure of the multiresolution coefficients is used. The number of layers used in the device is noted K (K>1). Accordingly, K groups of coefficients are transferred to the line buffers:
- a group of base coefficients in a given layer r=1 providing a representation of a frame at a first resolution level (k=1);
- K−1 groups of refinement coefficients in layers r=2,..., K. The refinement coefficients of layer r+1 ($1 \leq r<K$) provide additional data to transform a representation of a frame at resolution level k=r into a representation of the frame at the next resolution level k+1.

The base coefficients represent a frame at a first resolution level k=1. This can be a low resolution image representation, corresponding to a low-pass approximation of the frame obtained in a wavelet transform. In the example depicted in FIG. 1, line buffer 102 contains base coefficients in layer r=1, line buffer 103 contains refinement coefficients in layer r=2 and line buffer 104 contains refinement coefficients in layer r=3. The representation of a frame at a $k^{th}$ resolution level ($k \geqq 1$) can be obtained iteratively from the coefficients of layers r=1 to r=k.

If the image is multi-channel (e.g. a color image with Y, U and V components for each pixel), a base coefficient representation can be a low-resolution representation of each channel, with possibly different resolution indexes for each channel. In a limit case, a channel can be completely absent, which is referred to as a $j=-\infty$ resolution index. Each layer or resolution level then corresponds to a choice of a resolution index j for each channel.

In an exemplary embodiment, K=3 layers are defined, using layers of coefficients r=1, 2 and 3. The respective resolutions for Y, U and V may be in accordance with Table I.

TABLE I

| Layers | Resolution level | Y resolution index | U resolution index | V resolution index |
|---|---|---|---|---|
| r = 1 | k = 1 | j = −2 | j = −∞ | j = −∞ |
| r = 1 and 2 | k = 2 | j = −1 | j = −2 | j = −2 |
| r = 1, 2 and 3 | k = 3 | j = 0 | j = −1 | j = −1 |

In this example, the representation at level k=1 provided by the base coefficients in layer r=1 only contains a coarse representation (scaling coefficients) of the Y channel with the resolution index j=−2, while layer r=2 introduces color information with the resolution index j=−2 into the representation at level k=2. The refinement coefficients in layer r=2, stored in line buffer 103, are thus wavelet coefficients with the resolution index j=−2 to increase the resolution of the Y channel from j=−2 to j=−1, and low-pass scaling coefficients providing a full representation of the U and V channels with the resolution index j=−2. The refinement coefficients in layer r=3, stored in line buffer 104, are wavelet coefficients for the Y channel with the resolution index j=−1 to increase the resolution of the Y channel from j=−1 to j=0, and wavelet coefficients for the U and V channels with the resolution index j=−2 to increase the resolution of the U and V channels from j=−2 to j=−1.

Such a choice for the layer structure can be suitable, for example, when processing video frames that are already downsampled in the chroma channels, such as all MPEG-encoded video represented in the so-called YUV 4:2:0 format.

Figure 2:
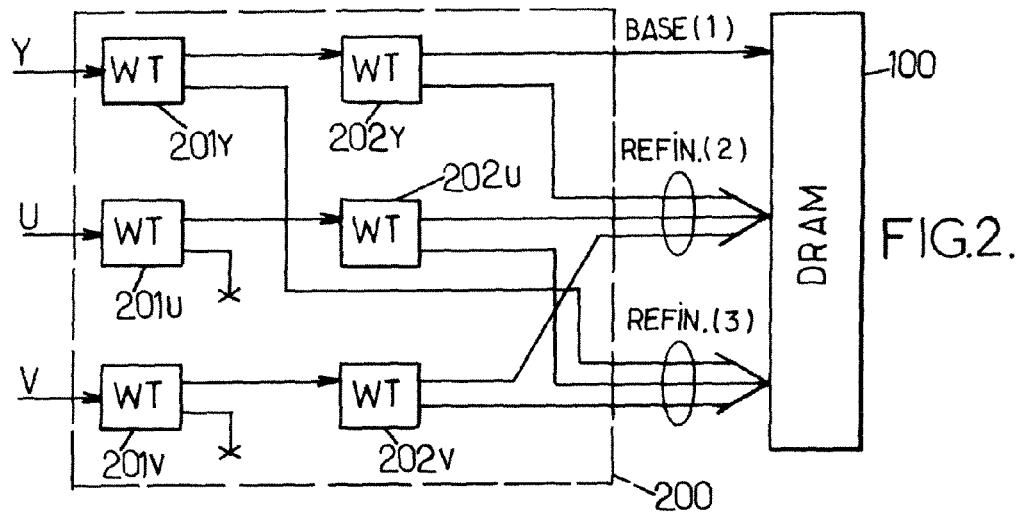
FIG. 2 is a block diagram of an exemplary wavelet transform unit usable with the device of FIG. 1.

The coefficients indicated in Table I can also be generated from the Y, U and V channels of the video signal by means of a wavelet transform unit 200 as illustrated in FIG. 2. In this example, the wavelet transform unit 200, which may be embodied in the same chip as the FRC circuit 101, has six elementary wavelet transform (WT) blocks. Three elementary WT blocks 201Y, 201U, 201V decompose at resolution index −1 the Y, U and V components of the signal, the wavelet coefficients being discarded for the chroma channels U, V. The other three elementary WT blocks 202Y, 202U, 202V decompose at resolution index −2 the scaling coefficients output by blocks 201Y, 201U and 201V. The scaling coefficients for the Y channel with resolution index −2 are written into the DRAM frame store 100 as base coefficients in layer 1. The wavelet coefficients for the Y channel with resolution index −2 are grouped with the scaling coefficients for the U and V channels with resolution index −2 to be written into the DRAM frame store 100 as refinement coefficients in layer 2. The wavelet coefficients for the Y channel with resolution index −1 are grouped with the wavelet coefficients for the U and V channels with resolution index −2 to be written into the DRAM frame store 100 as refinement coefficients in layer 3.

The FRC circuit 101 of FIG. 1 has two kinds of processing modules using the layered coefficients:
 geometry detectors 107-109 forming a geometry detection section with a selector 110; and
 interpolators 111, 112 forming an interpolation section with a combiner 113.

Each geometry detector 107-109 receives a representation of a frame generated at a respective resolution level k, i.e. using coefficient layers r=1 to k. The resolution level 1 detector 107 reads in line buffer 102 the base coefficients forming the representation REP.(1) of the frame at the first resolution level, and computes a geometry for resolution level k=1.

Figure 3:
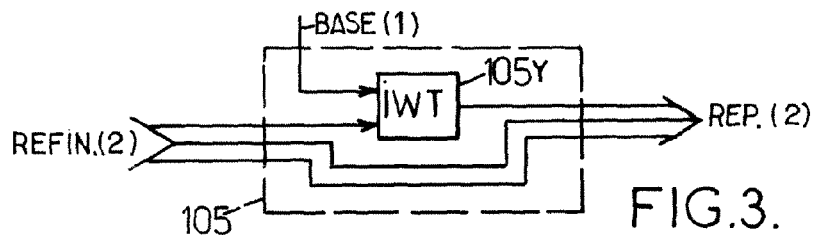
FIGS. 3 and 4 are block diagrams of exemplary inverse wavelet transform units usable in the device of FIG. 1.

The resolution level 2 geometry detector 108 receives the representation REP.(2) of the frame computed using coefficient layers r=1 and 2 and derives a geometry for resolution level k=2. The representation REP.(2) received by detector 108 is not read from one of the line buffers, but recombined by an inverse wavelet transform unit 105 from (i) base coefficients of layer r=1 read from line buffer 102 and (ii) the refinement coefficients of layer r=2 read from line buffer 103. It corresponds to the scaling coefficients output by the WT blocks 201Y, 202U and 202V of FIG. 2. The inverse wavelet transform unit 105 may be arranged as shown in FIG. 3, with an elementary inverse wavelet transform (IWT) block 105Y to recombine the Y scaling coefficients with resolution index −2 forming the base coefficients of layer r=1 with the Y wavelet coefficients with resolution index −2 extracted from the refinement coefficients of layer r=2.

Figure 4:
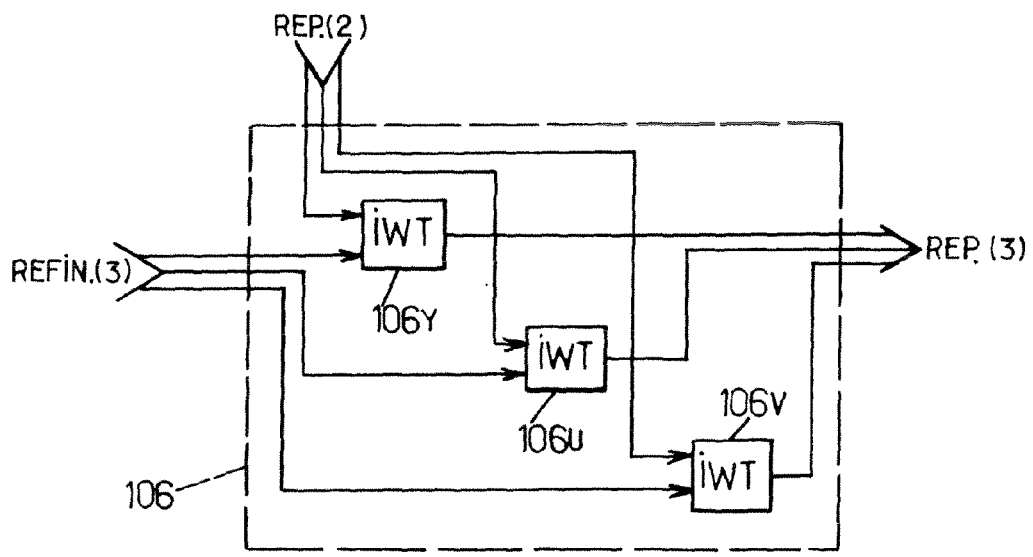

Likewise, the resolution level 3 geometry detector 109 receives the representation REP.(3) of the frame computed using coefficient layers r=1, 2 and 3, and derives a geometry for resolution level k=3. The representation REP.(3) received by detector 109 is not read from one of the line buffers, but recombined by another inverse wavelet transform unit 106 from (i) the representation REP.(2) of the frame for resolution level k=2 received from the transform unit 105 and (ii) the refinement coefficients of layer r=3 read from line buffer 104. It corresponds to the pixel representation of the Y channel and to the scaling coefficients output by the WT blocks 201U and 201V of FIG. 2. The inverse wavelet transform unit 106 may be arranged as shown in FIG. 4, with three elementary IWT blocks 106Y, 106U, 106V. The IWT block 106Y recombines the Y scaling coefficients with resolution index −1 extracted from the representation REP.(2) of the frame for resolution level k=2 with the Y wavelet coefficients with resolution index −1 extracted from the refinement coefficients of layer r=3. The IWT block 106U recombines the U scaling coefficients with resolution index −2 extracted from the representation REP.(2) of the frame for resolution level k=2 with the U wavelet coefficients with resolution index −2 extracted from the refinement coefficients of layer r=3. The IWT block 106V recombines the V scaling coefficients with resolution index −2 in a similar way.

For each target pixel location, each geometry detector 107-109 computes loss values L for a number of directions v belonging to a set of candidate directions of regularity in the video. The loss value is for example a directional energy computed according to (2) for each channel.

Then, the selector 110 receives the directions v and associated loss values L from the geometry detectors 107-109, selects among the directions a subset of directions v and associated loss values L and outputs the selected direction and loss values. The selector 110 typically applies a threshold to the loss values L in order to eliminate the non-relevant candidate directions v. The threshold can be fixed or chosen dynamically depending on the image contents. It will be appreciated that the selection could also be performed, in part or completely, in the detector modules 107-109.

The interpolators 111, 112 use the directions provided by the selector 110, together with a representation of the frames at a resolution level which may be different from the one that was used to detect some of the directions v received by these interpolators 111, 112. The resolution level 2 interpolator 111 uses directions provided by the selector 110 and computes interpolated pixels using the representation REP.(2) of the frame at resolution level k=2. The resolution level 3 interpolator 112 uses directions provided by the selector 110 and computes interpolated pixels using the representation REP.(3) of the frame at the maximum resolution level k=3.

In an exemplary embodiment, for each direction of regularity v=(dx, dt) provided by selector 110, the resolution level 2 interpolator 111 computes a pixel value p by interpolating between the pixels values of the frame representation at resolution level k=2 using the direction v. In the above example of layers in Table 1, the interpolator 111 interpolates channel values for $Y_{t+dt/2}(x)$, $U_{t+dt/2}(x)$ and $V_{t+dt/2}(x)$:

$$C_{j,t+dt/2}(x) = [C_{j,t}(2^j \cdot x - 2^j \cdot dx/2) + C_{j,t+dt}(2^j \cdot x + 2^j \cdot dx/2)]/2 \quad (3)$$

where the values of the image arrays at non integer pixel positions are estimated using spatial interpolation. The formula (3) is used with j=−1 for Y, and with j=−2 for U and V.

The resolution level 3 interpolator 112 performs the same kind of interpolation as the interpolator 111, but using the frame representation at resolution level k=3. According to the above example of layer organization, the interpolator 112 uses (3) with j=0 for Y coefficients and j=−1 for U and V coefficients.

Objects having a high vertical speed in the video are advantageously analyzed with a lower resolution than objects having a low vertical speed. Also, the interpolation of the corresponding area of the video is preferably of high resolution for objects having low vertical speeds, and of low resolution for objects having high vertical speeds. Since high-speed objects are affected by motion blur, it is reasonable to perform low resolution interpolation on the area of image that they cover. In addition, the human eye is less accurate in reading textures if these textures are moving with a high speed. This makes it less critical to perform accurate interpolations on high-speed contents. These considerations make it possible to consider tradeoffs as discussed further below.

Figure 5:
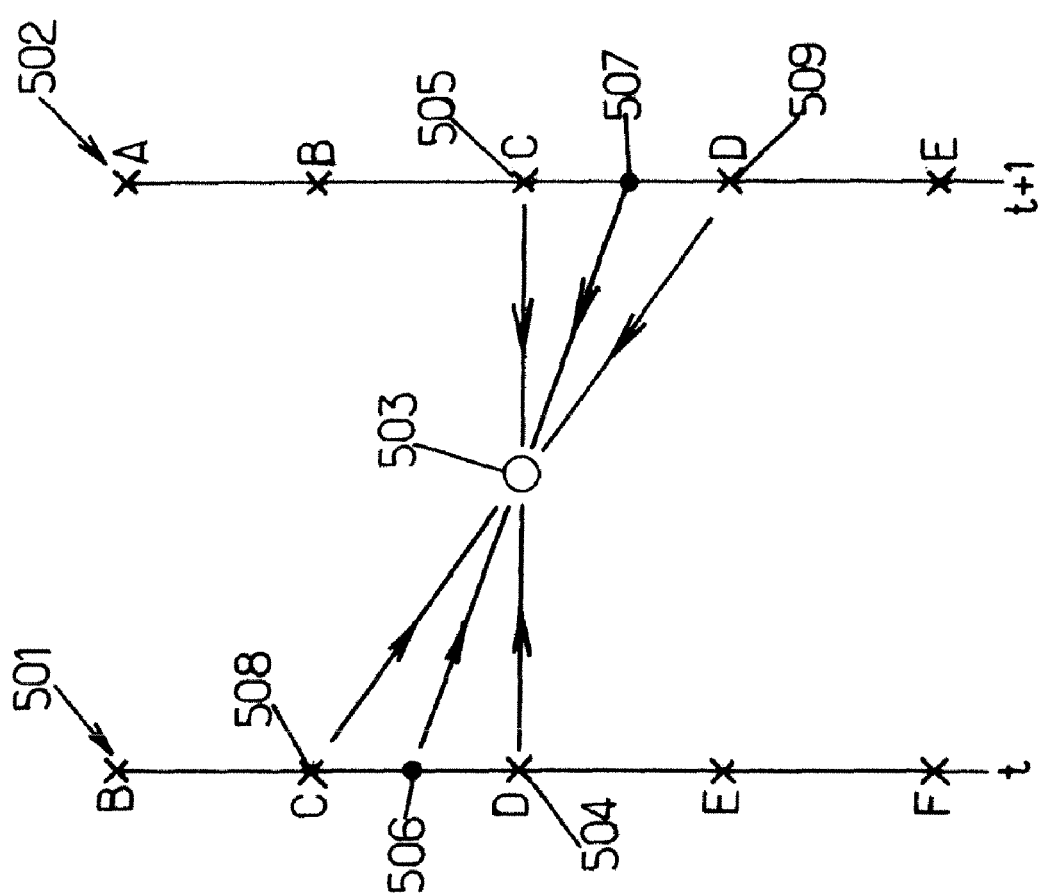
FIG. 5 is a diagram illustrating pixel interpolation for frame rate doubling in a particular case of a vertically moving pattern.

FIG. 5 illustrates the impact of detecting geometry from reference frames at a resolution level k and using the computed geometry to interpolate at resolution level k+1. Reference numerals 501 and 502 denote two columns of pixels in video frames at times t and t+1. We consider a pixel 503 to be interpolated at time t+½. Letters A to F displayed on each side represent pixel values at each location of each input frame. This example corresponds to some pattern moving down by one pixel from frame t to frame t+1. Three different space-time directions are displayed in FIG. 5 with pairs of arrows:
 a direction (0,0,1) corresponding to interpolation between pixels 504 and 505 (values D and C);
 a direction (0,1,1) corresponding to interpolation between interpolated pixels 506 and 507 (pixel values of (C+D)/2 for both if the spatial interpolation is done with a 2-tap linear interpolator);
 a direction (0,2,1) corresponding to interpolation between pixels 508 and 509 (values C and D).

The direction that the most closely corresponds to the motion of the pattern in time is (0,1,1). If a 2-tap linear interpolator is used for spatial interpolation, each of the three directions yields the same interpolated pixel value (C+D)/2. This illustrates that using a direction of (0,0,1) or (0,2,1) in this case instead of (0,1,1) does not change the result of the interpolation stage. In practice, spatial interpolation is usually performed with higher order filters, but this gain in precision is only useful if the direction is estimated with a high accuracy and if the gain in precision is visible. The eye sensitivity and the screen response (e.g. motion blur of liquid crystal displays) vary strongly on static and moving patterns.

A number of parameters can be provided to adjust the accuracy of the FRC processing depending on the spatio-temporal geometry of the video, including the resolution level of the reference frame representations used for the detection and/or the interpolation, and the difference between the resolution level of frames used by detecting directions and that used for interpolating. Various grades of frame-rate conversion can then be offered by the device:
 interpolation at resolution level 3 (maximum resolution) with direction detection at resolution level 3;
 interpolation at resolution level 3 with direction detection at resolution level 2;
 interpolation at resolution level 2 with direction detection at resolution level 2;
 interpolation at resolution level 2 with direction detection at resolution level 1; etc.

The organization of the coefficients in different layers (base and refinement) can be done based on resolution only (j=r−K for each channel), or in a mixed manner as exemplified in Table 1 and FIGS. 2-4 (j=r−K for the Y channel; j=r−K−1 for the U and V channels, except j=−∞ for r=1).

In an embodiment, referred to as "split" embodiment, the candidate directions evaluated by detectors 107-109 are provided as separate sets of directions covering non-overlapping ranges for the vertical component of the directions (transverse to the lines along which the target pixels are scanned). The detector 107 computes the loss values for directions corresponding to objects having a high vertical speed, while the detector 108 handles objects having a lower vertical speed, and the detector 109 handles objects having an even lower vertical speed. Alternatively, in a "nested" embodiment, the detectors 107-109 use embedded ranges of directions.

Figure 6:
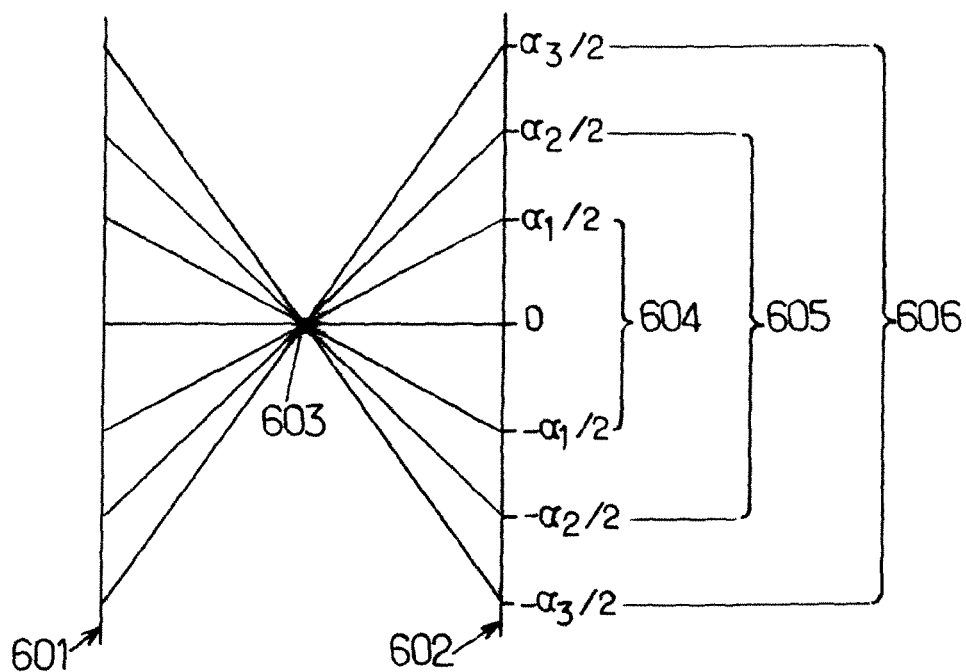
FIG. 6 is a diagram illustrating different ranges of directions usable by geometry detectors in certain embodiments of the invention.

These two embodiments are explained in more detail below, with reference to FIG. 6. The sets of directions differ one from another by the range of directions they cover, and by how the directions are sampled. In FIG. 6, reference numerals 601 and 602 denote two video frames at times t and t+1, and 603 designates a target pixel to be interpolated for a video frame at time t+½. Various directions are considered for interpolation of pixel 603. Three ranges of directions are displayed on the figure, namely:
 a small range 604 of directions $(dx_1, dx_2, dt)$ such that the vertical-temporal slope $$\left|\frac{dx_2}{dt}\right|$$

is not larger than $\alpha_1$, i.e. $|dx_2| \leq \alpha_1 \cdot |dt|$;
 a range 605 of directions $(dx_1, dx_2, dt)$ such that $|dx_2| \leq \alpha_2 \cdot |dt|$, with $\alpha_2 > \alpha_1$; and
 a large range 606 of directions $(dx_1, dx_2, dt)$ such that $|dx_2| \leq \alpha_3 \cdot |dt|$, with $\alpha_3 > \alpha_2$.

In the "split" embodiment, each of the geometry detectors 107-109 considers a separate set of candidate directions, and these sets are not overlapping. For example, the set of directions used by detector 107 is the set of directions $(dx_1, dx_2, dt)$ such that $\alpha_2 \cdot |dt| < |dx_2| \leq \alpha_3 \cdot |dt|$, $dt=1$ and $dx_1$ and $dx_2$ are both multiples of 4. The set of directions used by detector 108 is the set of directions $(dx_1, dx_2, dt)$ such that $\alpha_1 \cdot |dt| < |dx_2| \leq \alpha_2 \cdot |dt|$, $dt=1$ and $dx_1$ and $dx_2$ are both multiples of 2. The set of directions used by detector 109 is the set of directions $(dx_1, dx_2, dt)$ such that $|dx_2| \leq \alpha_1 \cdot |dt|$, $dt=1$ and $dx_1$ and $dx_2$ are both multiples of 1. Each detector computes a directional cost of the video signal for each direction, and may perform a first selection of directions that minimize the directional energy, or for which the directional energy is below a fixed threshold. For each candidate direction, only one directional energy or loss value is computed by one of the detectors 107-109 depending on the vertical-temporal slope of the candidate direction.

In the "nested" embodiment, the detectors 107-109 consider embedded ranges of candidate directions. For example, the directions $(dx_1, dx_2, dt)$ of the set used by detector 107 have vertical-temporal slopes $$\left|\frac{dx_2}{dt}\right|$$

such that $|dx_2| \leq \alpha_3 \cdot |dt|$, $dt=1$, while $dx_1$ and $dx_2$ are both multiples of 4.

The set of directions used by detector (108) is the set of directions $(dx_1, dx_2, dt)$ such that $|dx_2| \leq \alpha_2 \cdot |dt|$, $dt=1$, and $dx_1$ and $dx_2$ are both multiples of 2. The set of directions used by detector 109 is the set of directions $(dx_1, dx_2, dt)$ such that $|dx_2| \leq \alpha_1 \cdot |dt|$, $dt=1$, and $dx_1$ and $dx_2$ are both multiples of 1. In this case, up to three loss values are computed for directions in the small range 604, up to two loss values are computed for directions in the intermediate range 605 and one loss value is computed for directions in the large range 606.

In both the "split" and "nested" embodiments, each of the detectors 107-109 may output a fixed or variable number of directions $v=(dx, dt)$ each associated with a respective loss value L. For example, each detector can select the subset of directions corresponding to a directional energy lower than a fixed threshold, and output the directions of this subset with respective loss values equal to the corresponding directional energies.

The selector 110 receives sets $\{(v, L)\}$ of directions/loss value pairs from the geometry detectors 107-109 and outputs a reduced set of such pairs for each pixel to be interpolated.

In the "split" embodiment, the decision module 110 can simply select the directions that have a loss value less than a threshold. This threshold can be fixed or preferably computed from the candidate directions as follows. First the "best" direction $v_0$ is determined as the direction for which the loss value $L_0$ is minimal. Then the threshold T is calculated as a function of $L_0$, for example $T=2 \cdot L_0$. Finally, all directions v received by the decision module 110 with a loss value L larger than T are discarded.

In the "nested" embodiment, the decision module 110 can apply a similar selection procedure. It may further be adapted to eliminate a direction v received from the geometry detector operating at a given resolution level k>1 if no direction close enough to v (e.g. the closest to v, or equal to v) was selected as received from the geometry detector operating at the lower resolution level k−1. This is a way to validate a choice of a direction detected from high resolution coefficients of the input frames with a corresponding direction detected from lower resolution coefficients.

Each of the interpolators 111, 112 can be arranged to compute interpolated pixel values for directions in a predefined range of directions only. In an exemplary embodiment, interpolator 111 is capable of interpolating along directions $v=(dx_1, dx_2, dt)$ having vertical-temporal slopes $$\left|\frac{dx_2}{dt}\right|$$

such that $\beta_1 \cdot |dt| < |dx_2| \leq \beta_2 \cdot |dt|$, with $0 < \beta_1 < \beta_2$, and interpolator 112 is capable of interpolating along directions $v=(dx_1, dx_2, dt)$ such that $|dx_2| \leq \beta_1 \cdot |dt|$. When an interpolator receives a direction in input which is not within its range of allowed directions, the direction is dropped, and no corresponding output is provided by the interpolator.

Each of the interpolators 111, 112 outputs, for each pixel to be interpolated and each relevant direction v received for that pixel, an interpolated pixel value p, for example computed according to (3), associated with a loss value L that can be identical to the loss value received by the interpolator for that direction.

The combiner 113 receives the interpolated pixel values p and associated loss values L from the interpolators 111, 112. It combines the interpolated pixel values p to output a single pixel value, advantageously with weights derived from the loss values. Many different kinds of combination can be used in combiner 113. In an exemplary embodiment, the output pixel value p' is:

$$p' = \frac{\sum_{\{(p,L)\}} p \cdot e^{-L/L_0}}{\sum_{\{(p,L)\}} e^{-L/L_0}} \tag{4}$$

The above embodiments enable a substantial reduction of logic size and memory in the hardware architecture of the FRC device.

Figure 7:
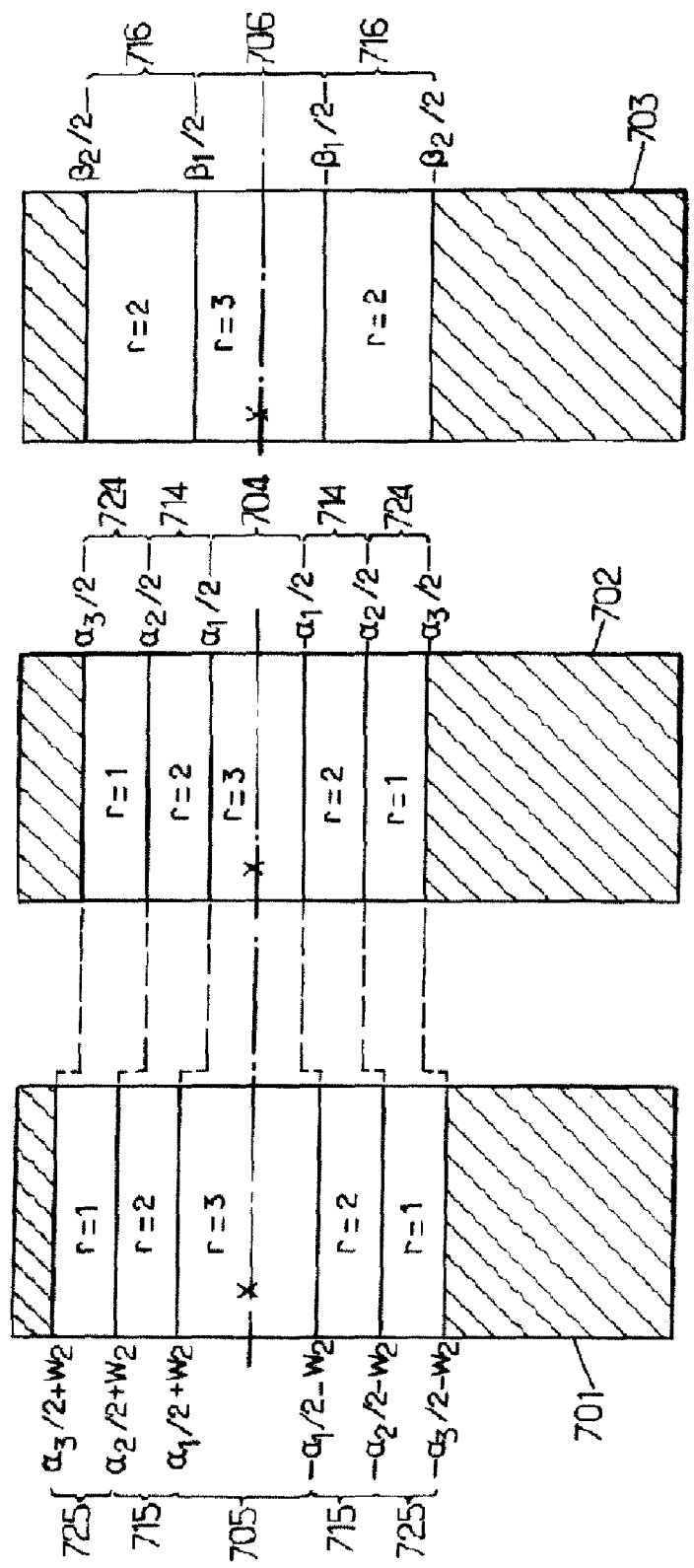
FIG. 7 shows maps of video frames illustrating different regions for FRC processing.

An organization of the memory is illustrated in FIG. 7. The maps 701-703 represent a frame or a stripe of a frame at time index t+1, used by a frame rate converter. By way of example, two such frames at times t and t+1 are used by the FRC circuit 101 when computing an interpolated frame at t+½. In map 702, different areas of the frame are represented. These areas are the traces on frame t+1 of the various sets of directions used by the geometry detectors 107-109 for a pixel $(x_1, x_2, t+½)$. The trace of a set of directions $(dx_1, dx_2, dt)$ on frame t+1 is the set of pixels $(x_1+dx_1/(2dt), x_2+dx_2/(2dt), t+1)$. The trace on frame t is not displayed in FIG. 7, but is disposed in a symmetric way as the set of pixels $(x_1-dx_1/(2dt), x_2-dx_2/(2dt), t)$.

A first trace 704 ("r=3") corresponds to a detection interval made of directions $(dx_1, dx_2, dt)$ having vertical-temporal slopes $$\left|\frac{dx_2}{dt}\right|$$

lower than $\alpha_1$, i.e. such that $|dx_2| \leq \alpha_1 \cdot |dt|$. Another trace 714 ("r=2") corresponds to a detection interval made of directions $(dx_1, dx_2, dt)$ having vertical-temporal slopes $$\left|\frac{dx_2}{dt}\right|$$

between $\alpha_1$ and $\alpha_2$ ($\alpha_1 \cdot |dt| < |dx_2| \leq \alpha_2 \cdot |dt|$). A last trace 724 ("r=1") corresponds to a detection interval made of directions having vertical-temporal slopes $$\left|\frac{dx_2}{dt}\right|$$

between $\alpha_2$ and $\alpha_3$ ($\alpha_2 \cdot |dt| < |dx_2| \leq \alpha_3 \cdot |dt|$).

The traces 704, 714, 724 in frame t+1 and similar traces in frame t indicate pixels needed at both ends of the candidate direction vectors relating to the target pixel ($x_1$, $x_2$, t+½). When detecting directions, an additional context or window of pixels around each pixel in these traces 704, 714, 724 is needed to compute the directional energy. The overall context of pixels is displayed as the non-hatched portion of map 701. Three regions 705, 715, 725 are distinguished in the frame (or frame tile), with respective notations "r=3", "r=2" and "r=1". Each of regions 715 and 725 is made of two non-connected parts symmetrically placed about region 705.

The geometry detector 107 operating according to the "split" embodiment, with frame coefficients of layer r=1, needs coefficients corresponding to pixels in trace 724, with some additional coefficient lines above and below each line of trace 724 for estimating the directional energies. It thus needs coefficients corresponding to vertical-temporal slopes $$\left|\frac{dx_2}{dt}\right|$$

in an expanded range $]\alpha_2 - 2w_2, \alpha_3 + 2w_2]$. Such coefficients relate to pixels located mainly in region 725 and in part in region 715. Likewise, the geometry detector 108 (r=2) needs coefficients corresponding to pixels in trace 714 with some more lines (vertical-temporal slopes $$\left|\frac{dx_2}{dt}\right|$$

in the expanded range $]\alpha_1 - 2w_2, \alpha_2 + 2w_2]$), such pixels being located mainly in region 715 and in part in region 705. Finally, the geometry detector 109 (r=3) operating according to the "split" embodiment needs coefficients corresponding to pixels in trace 704 with some more lines (vertical-temporal slopes $$\left|\frac{dx_2}{dt}\right|$$

lower than $\alpha_1 + 2w_2$), such pixels being located only in region 705.

When the detectors 107-109 operate according to the "nested" embodiment, they need different sets of coefficients, but these are also available in the pixel context illustrated in map 701.

The map 703 in FIG. 7 illustrates contexts of coefficients that are required by interpolators 111-112 to be able to interpolate pixels within the range of directions used by the geometry detectors 107-109. In this embodiment, $\beta_2 = \alpha_3$, and $\beta_1$ is in the range $[\alpha_1, \alpha_2]$.

The traces 706, 716 in frame t+1 and similar traces in frame t indicate the input pixels whose values may be used to generate the interpolated value of the target pixel ($x_1$, $x_2$, t+½). The first trace 706 ("r=3") corresponds to an interpolation interval made of directions ($dx_1$, $dx_2$, dt) having vertical-temporal slopes $$\left|\frac{dx_2}{dt}\right|$$

lower than $\beta_1$, i.e. such that $|dx_2| \leq \beta_1 \cdot |dt|$. Another trace 716 ("r=2") corresponds to an interpolation interval made of directions ($dx_1$, $dx_2$, dt) having vertical-temporal slopes $$\left|\frac{dx_2}{dt}\right|$$

between $\beta_1$ and $\beta_2$ ($\beta_1 \cdot |dt| < |dx_2| \leq \beta_2 \cdot |dt|$). In this example, no interpolation is performed at the lowest resolution layer (r=1).

In this example, we have $\alpha_1 \leq \beta_1 \leq \alpha_2 < \alpha_3 = \beta_2$. Therefore, for the directions of regularity ($dx_1$, $dx_2$, dt) such that $\alpha_2 \cdot |dt| < |dx_2| \leq \beta_2 \cdot |dt|$ or such that $\alpha_1 \cdot |dt| < |dx_2| \leq \beta_1 \cdot |dt|$, the input frames representations used for determining such directions of regularity in detector 107 or 108 are at a resolution level k=1 or 2, lower than the resolution level k=2 or 3 of the input frame representations used for interpolating in interpolator 111 or 112 between pixel values for such directions of regularity.

The maps 701 and 703 illustrate the layout of the coefficients that are required for each part of the processing (geometry detection and interpolation) at a given location of a reference frame t+1. Similar maps can be drawn for reference frame t. These maps can be coined "layer" maps because they indicate at each location of a reference frame which coefficients are required for the processing in each layer. The lower layers (e.g., r=1) are far less expensive to store in internal memory than higher layers (e.g., r=3). In addition, in the processing of a current line of the frame, no coefficient information is needed out of the regions labeled with "r=3", "r=2" or "r=1", i.e. in the hatched portions of maps 701 and 703.

Figure 8:
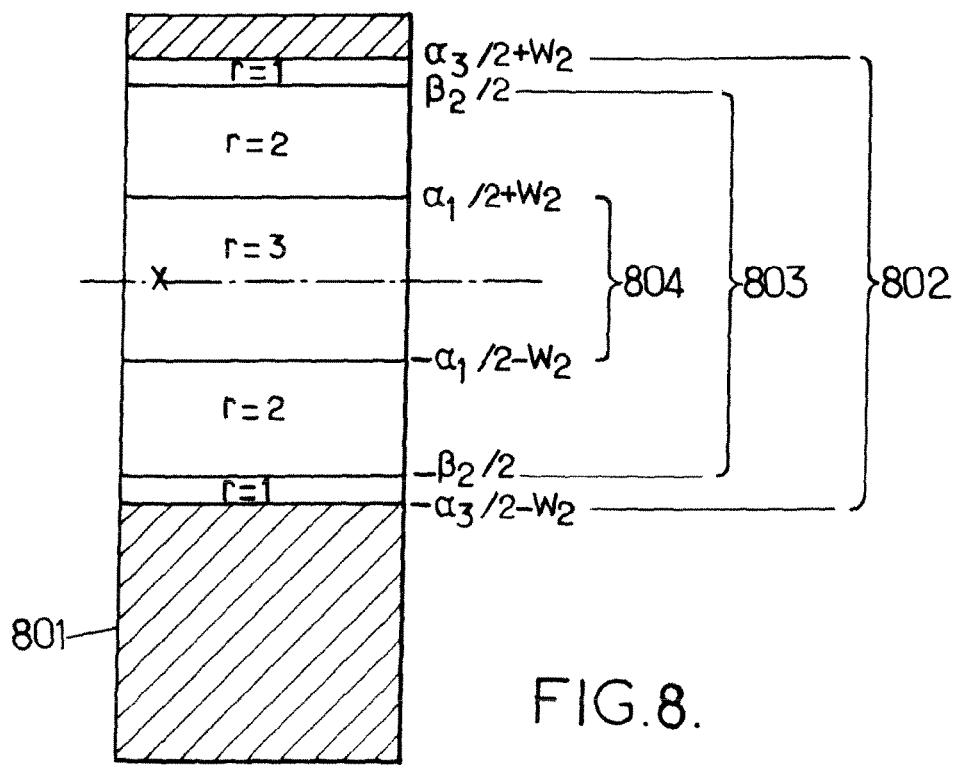
FIGS. 8 and 9 show maps of a video frame illustrating regions of coefficients to be stored into line buffers in different embodiments of the FRC method.

If there is no significant delay between the geometry detection in modules 107-109 and the resulting interpolation in modules 111-112, the line buffers 102-104 must be dimensioned to contain the information to be made available to those modules 107-109, 111-112 for the processing of one line. The non-hatched portion of map 801 in FIG. 8 shows the pixels of the current image t+1 whose coefficients must be present in line buffers 102-104 to determine the value of a current pixel "x" having a vertical position z at time t+½, in a case where $\alpha_1 \leq \beta_1 \leq \alpha_2 < \alpha_3 = \beta_2 < \alpha_3 + 2w_2$ and $2w_2 \leq \alpha_1 - \beta_1$:

line buffer 102 contains the coefficients of layer r=1 associated with pixel positions in a first frame region 802, i.e. with vertical positions in the range $[z - \alpha_3/2 - w_2, z + \alpha_3/2 + w_2]$;

line buffer 103 can contain the more memory-consuming coefficients of layer r=2 only for pixel positions in a smaller frame region 803, i.e. with vertical positions in the range $[z - \beta_2/2, z + \beta_2/2]$;

line buffer 104 can contain the most memory-consuming coefficients of layer r=3 only for pixel positions in an even smaller frame region 804, i.e. with vertical positions in the range $[z-\alpha_1/2-w_2, z+\alpha_1/2+w_2]$.

The first frame region 802 includes the second frame region 803 which includes the third frame region 804. Therefore, the contents of the line buffer section 120 when processing a current line of an output frame makes it possible to retrieve a representation at the $k^{th}$ resolution level of the $k^{th}$ frame region for each $k=1, 2, \ldots, K$.

In an alternative embodiment, the selector 110 combines detections provided for different target pixel locations in a rectangular window $[x_1-D_1, x_1+D_1] \times [x_2-D_2, x_2+D_2]$ to output a number of directions for pixel $(x_1, x_2)$ at time $t+\frac{1}{2}$. The selector 110 then includes a line buffer of input data, and it introduces some line delay in the processing between the geometry detection in modules 107-109 and the resulting interpolation in modules 111-112.

Figure 9:
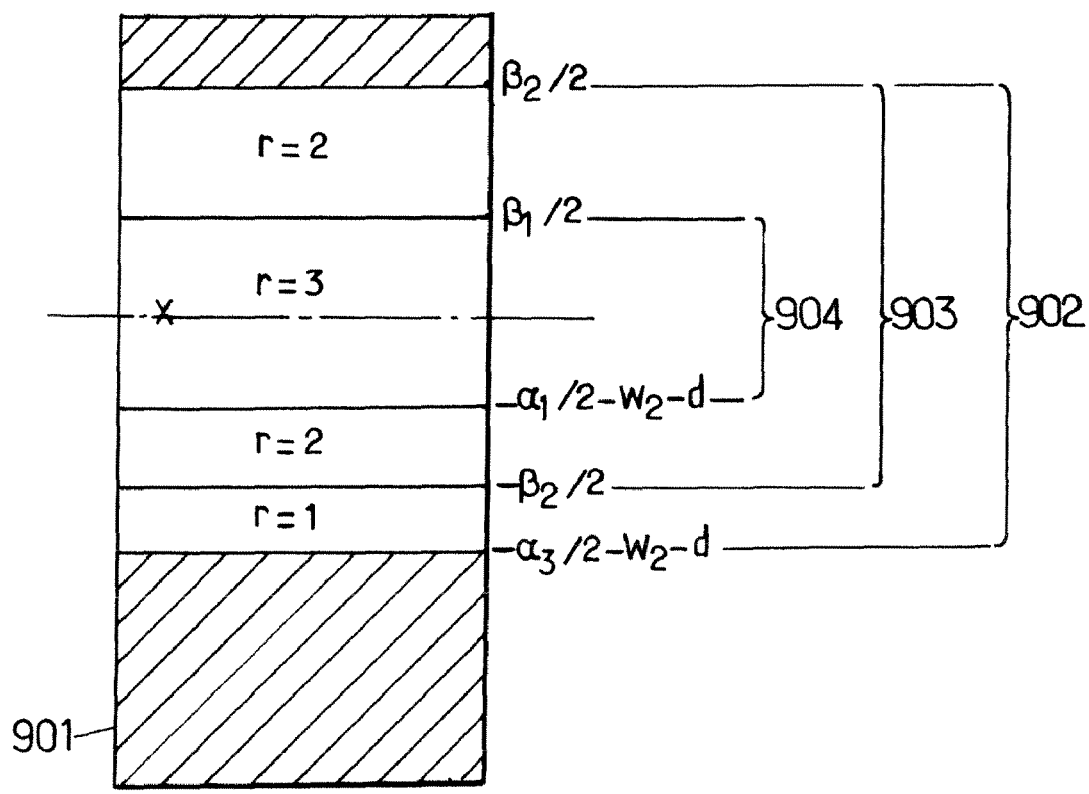

In such an embodiment, the overall context of coefficients that is required by the FRC processing is the union of the contexts shown in map 703 in FIG. 7 and in map 701 delayed by a number of lines d fixed by $D_2$. A corresponding map 901 is shown in FIG. 9, assuming that the frame lines are scanned in the raster order (downwards on the figure) in a case similar to FIG. 8 with $w_2 \leq d$. In this particular case, the three nested frame regions 902-904 are similar to regions 802-804 in FIG. 8 offset downwards to account for the delay of d lines introduced by the decision module 110.

The internal memory size of the FRC circuit 101 is reduced because line buffers of various resolutions are used instead of a full resolution line buffer. The different resolution levels for which the geometry is examined by the detectors 107-109 also implies a substantial reduction in logic size, especially in the "split" embodiment of the detectors.

The method can also be implemented in software. Instead of reduction of logic size and of internal memory size, the benefit is then a reduced computation time because the reduction in logic size translates into reduced number of operations, and the reduction of the size of the line buffers 102-104 translates into a reduction of the cache misses in a software implementation, and again in a reduction of computation time.

Figure 10:
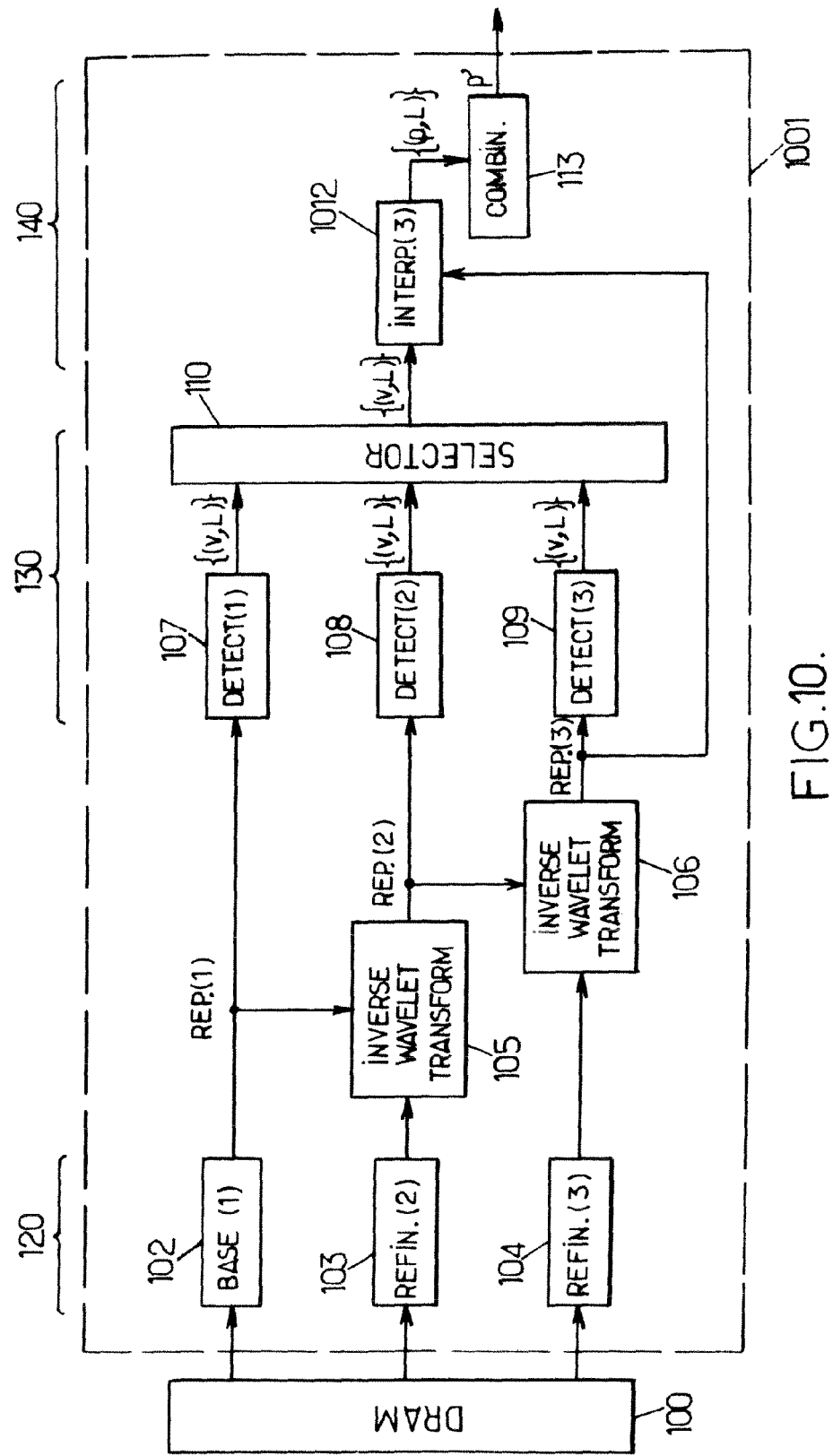
FIGS. 10 to 12 are block diagrams of other FRC devices.

FIG. 10 illustrates another embodiment of the FRC device. The circuit 1001 is very similar to that of FIG. 1 (same reference numerals designate identical elements), except for the interpolation stage which has only one interpolator 1012 for interpolating between pixel values of frame representations at the highest level K=3. Adaptation of the input frame resolution to the vertical speed of the moving objects is then performed only in the geometry detection section.

Figure 11:
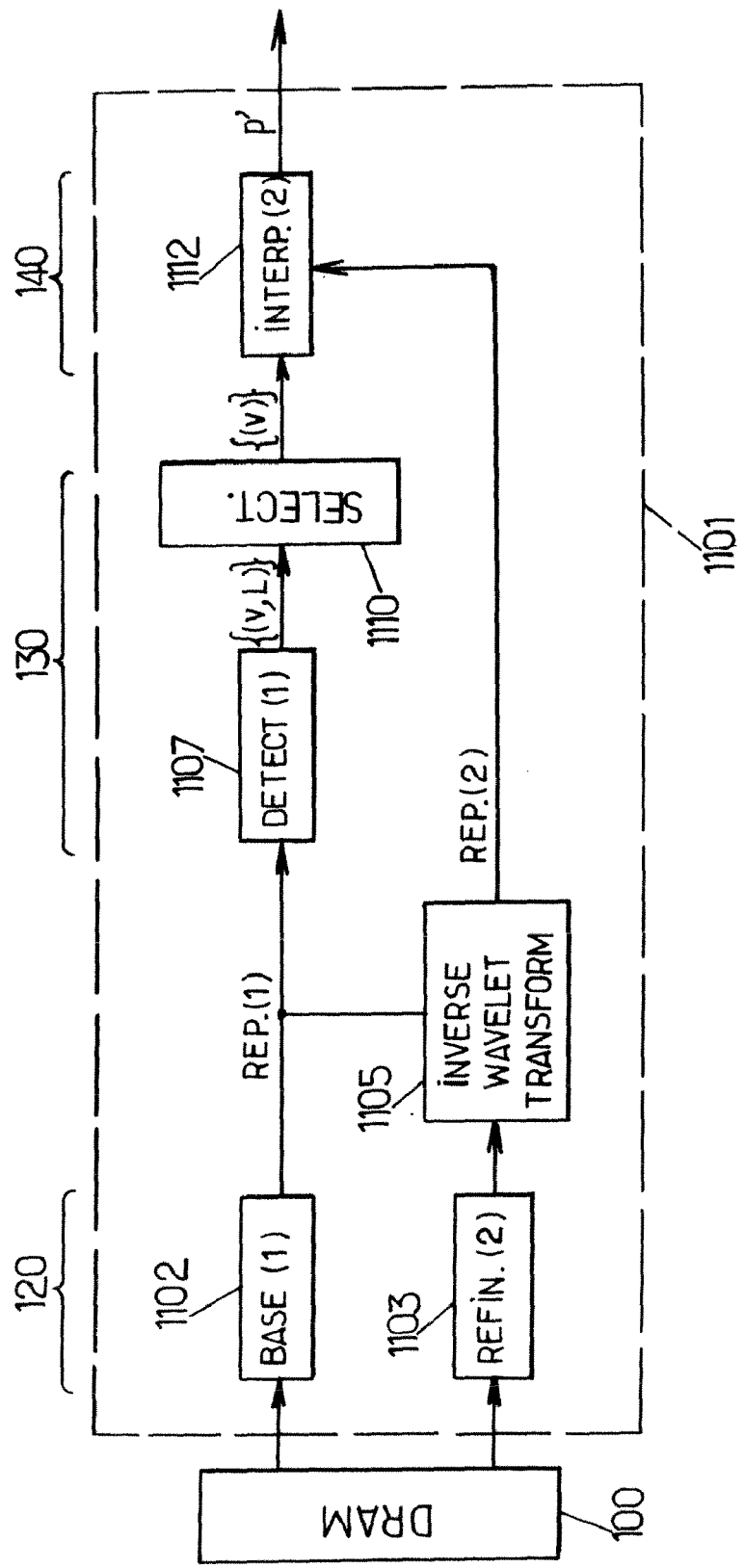

In the alternative embodiment of FIG. 11, there is no adaptation of the resolution to the vertical speed of moving objects, but a different resolution level is chosen for processing in the geometry detection section and in the interpolation section. In this example, there are only K=2 resolution levels and the base coefficients of layer r=1 and stored in line buffer 1102. The line buffer 1103 for the layer 2 refinement coefficients, the inverse wavelet transform unit 1105 and the geometry detector 1107 can be the same as those having references 103, 105 and 107 in FIG. 1. Furthermore, in the FRC circuit 1101 of FIG. 11, the selector 1110 is simplified to output only one direction of regularity per target pixel, i.e. the one having the minimum loss value computed with the resolution level 2 by detector 1107. The interpolating section then consists of only one interpolator 1112 operating at the highest resolution level K=2 according to the above formula (3).

Figure 12:
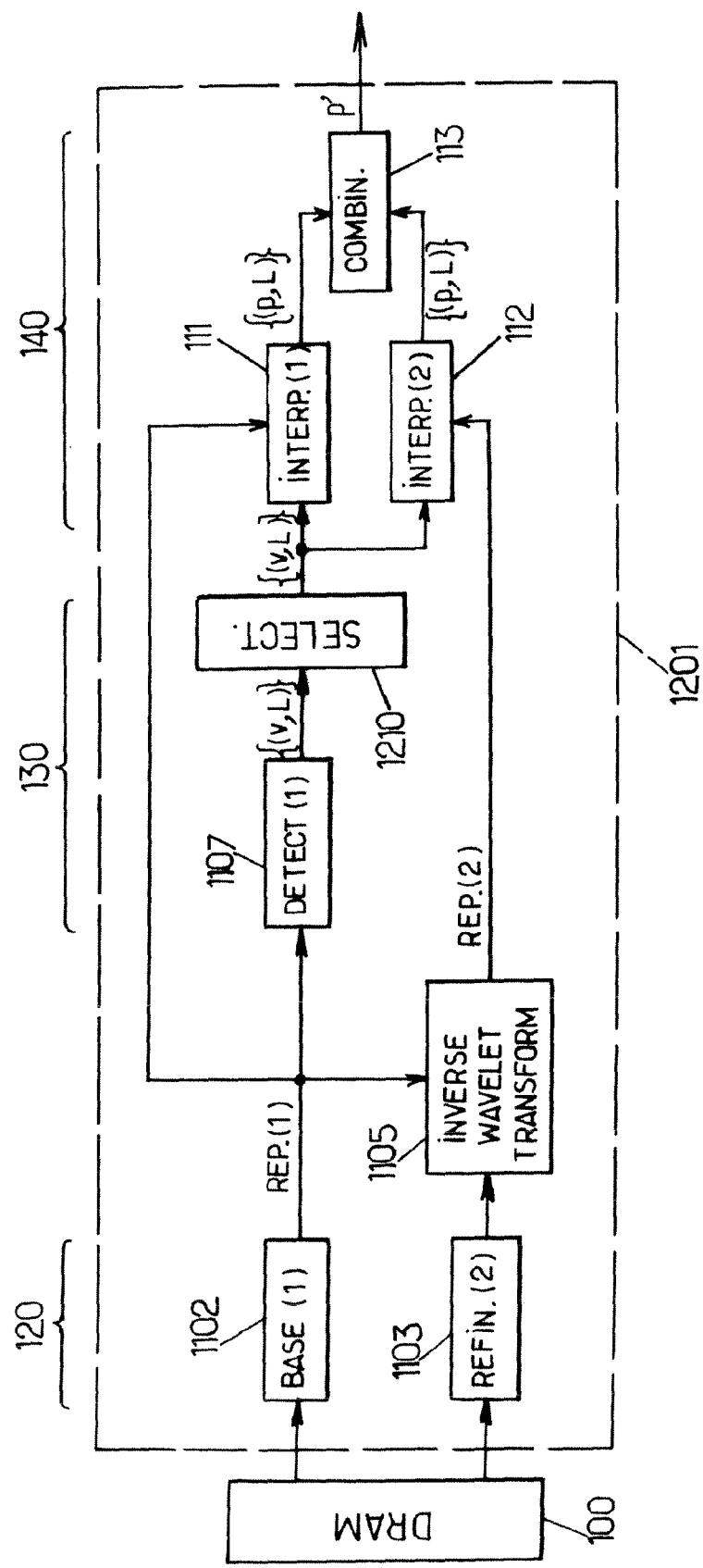

It is also possible to use more resolution levels in the interpolation section than in the geometry detection section. An example of this is depicted in FIG. 12, where the geometry detection section is identical to that of FIG. 11 except that the selector 1210 is arranged to output one or more directions of regularity among the candidate directions evaluated by the resolution level 1 detector 1107. The interpolation section in FIG. 12 is similar to that of FIG. 1 with two interpolators 1211, 1212 operating, for example, with two interpolation intervals 706, 716 as described with reference to FIG. 7.

The invention claimed is:

1. A method of converting the frame rate of a video sequence, comprising:

distributing multiscale coefficients obtained for each frame of an input video sequence into K groups of coefficients, K being a integer greater than 1, whereby a first group of coefficients provides a representation of the frame at a first resolution level and for each integer k such that $1 \leq k \leq K$, a $k^{th}$ group of coefficients and the representation of the frame at the $(k-1)^{th}$ resolution level determine a representation of the frame at a $k^{th}$ resolution level;

determining, in a geometry detection section, directions of regularity associated with pixels of at least one frame of an output video sequence based on representations of successive frames of the input video sequence at at least one of the resolution levels; and determining, in an interpolation section, an interpolated pixel value for each pixel of said frame of the output video sequence, the determination of the interpolated pixel value including, for each direction of regularity associated with said pixel, interpolating between pixel values from representations of successive frames of the input video sequence at at least one of the resolution levels;

wherein when considering a direction of regularity in at least one of the steps of determining directions of regularity and of determining interpolated pixel values, representations of the successive frames of the input video sequence are used at at least one resolution level depending on said direction of regularity.

2. The method as claimed in claim 1, wherein the interpolated pixel values are determined in succession along lines of the frame of the output video sequence, and wherein said representations of the successive frames of the input video sequence are used at at least one resolution level depending on a temporal slope of said direction of regularity along a spatial dimension transverse to the lines.

3. The method as claimed in claim 1, wherein determining an interpolated pixel value for a pixel of said frame of the output video sequence includes, for each direction of regularity associated with said pixel, interpolating between pixel values from the representations of successive frames of the input video sequence at a resolution level depending on said direction of regularity.

4. The method as claimed in claim 1, wherein if a plurality of directions of regularity are associated with a pixel of said frame of the output video sequence, determining an interpolated pixel value for said pixel comprises combining a plurality of values respectively obtained by interpolating between pixel values for each of said plurality of directions of regularity.

5. The method as claimed in claim 4, wherein the combination uses weights determined from respective loss values calculated when determining the directions of regularity.

6. The method as claimed in claim 1, wherein determining directions of regularity associated with a pixel of a frame of the output video sequence comprises:

estimating a respective loss value for each of a plurality of candidate directions, based on said candidate direction and on local representations of successive frames of the input video sequence at a resolution level depending on said candidate direction; and selecting directions of regularity among the plurality of candidate directions based on the estimated loss values.

7. The method as claimed in claim 6, wherein said plurality of candidate directions are taken from sets of candidate directions respectively associated with different resolution levels and covering separate ranges of directions of regularity, and wherein the loss value for said pixel and a candidate direction of one of the sets is estimated using local representations of the frames at the resolution level associated with said set.

8. The method as claimed in claim 7, wherein the spacing between the candidate directions of one of the sets is a decreasing function of the resolution level associated with said set.

9. The method as claimed in claim 1, wherein sets of candidate directions respectively associated with different resolution levels are defined to cover different ranges of directions of regularity such that the range covered by each set associated with a first resolution level is embedded in the range covered by any set associated with a second resolution level lower than said first resolution level, and wherein determining directions of regularity associated with a pixel of a frame of the output video sequence comprises:

for each of the different resolution levels, estimating a respective loss value for each candidate direction of the set associated with said resolution level, based on said candidate direction and on local representations of successive frames of the input video sequence at said resolution level; and selecting directions of regularity among the candidate directions based on the estimated loss values.

10. The method as claimed in claim 9, wherein selecting directions of regularity among the candidate directions comprises eliminating candidate directions having an estimated loss value above a threshold, and keeping each remaining candidate direction of the set associated with a first resolution level higher than a second resolution level if a candidate direction of the set associated with said second resolution level equal or closest to said candidate direction of the set associated with the first resolution level remains.

11. The method as claimed in claim 9, wherein the spacing between the candidate directions of one of the sets is a decreasing function of the resolution level associated with said set.

12. The method as claimed in claim 1, wherein for at least some directions of regularity, the step of determining directions of regularity involves representations of successive frames of the input video sequence at at least one resolution level different from the resolution level of the representations of the successive frames of the input video sequence used for interpolating between pixel values for said directions of regularity.

13. A frame rate conversion device, comprising:

a line buffer section for storing multiscale coefficients for representing locally successive frames of an input video sequence about a current line of an output video sequence, the stored multiscale coefficients being distributed into K groups of coefficients, K being a integer greater than 1, whereby a first group of coefficients provides a representation of a first frame region at a first resolution level, and for each integer k such that $1<k\leq K$, a $k^{th}$ group of coefficients and the representation of the $(k-1)^{th}$ frame region at the $(k-1)^{th}$ resolution level determine a representation of a $k^{th}$ frame region at a $k^{th}$ resolution level, the $k^{th}$ frame region being included in the $(k-1)^{th}$ frame region;

a geometry detection section having access to the line buffer section to determine directions of regularity associated with pixels of said current line based on pixel values from said representations of frame regions in successive frames of the input video sequence; and an interpolation section having access to the line buffer section to determine an interpolated pixel value for each pixel of said current line, the determination of the interpolated pixel value including, for each direction of regularity associated with said pixel, interpolating between pixel values from said representations of frame regions in successive frames of the input video sequence;

wherein at least one of the geometry detection and interpolation sections is arranged to take into account a direction of regularity using representations of frame regions in the successive frames of the input video sequence at at least one resolution level depending on said direction of regularity.

14. The device as claimed in claim 13, wherein said representations of the frame regions in the successive frames of the input video sequence are used at at least one resolution level depending on a temporal slope of said direction of regularity along a spatial dimension transverse to the lines of the output video sequence.

15. The device as claimed in claim 14, wherein a plurality of interpolation intervals are defined for the temporal slopes of the directions of regularity along said spatial dimension, and wherein the interpolation section has a plurality of interpolators each associated with a respective resolution level and with a respective interpolation interval for interpolating between pixel values from the representations of frame regions at said resolution level using directions of regularity having temporal slopes within said interpolation interval along said spatial dimension.

16. The device as claimed in claim 15, wherein the geometry detection section has a single detector for estimating respective loss values for pixels of the current line and for candidate directions based on said candidate directions and on the representations of frame regions at one resolution level, and a selector for selecting directions of regularity for the pixels of the current line among the candidate directions based on the estimated loss values.

17. The device as claimed in claim 14, wherein for each integer k such that $1<k\leq K$, the $k^{th}$ frame region is smaller than the $(k-1)^{th}$ frame region along said spatial dimension.

18. The device as claimed in claim 13, wherein a plurality of detection intervals are defined for the temporal slopes of the directions of regularity along said spatial dimension, and wherein the geometry detection section has:

a plurality of detectors each associated with a respective resolution level and with a respective detection interval, for estimating respective loss values for pixels of the current line and for candidate directions having temporal slopes within said detection interval along said spatial dimension based on said candidate directions and on the representations of frame regions at said resolution level; and a selector for selecting directions of regularity for the pixels of the current line among the candidate directions based on the estimated loss values.

19. The device as claimed in claim 18, wherein each detector associated with a resolution level and with a detection interval is arranged for estimating loss values for candidate directions belonging to a set of candidate directions associated with said resolution level, wherein the loss value for a pixel of the current line and a candidate direction of one of the sets is estimated using local representations of the frames at the resolution level associated with said set.

20. The device as claimed in claim 19, wherein the sets of candidate directions associated with different resolution levels cover separate temporal slope ranges of the candidate directions along said spatial dimension.

21. The device as claimed in claim 19, wherein the sets of candidate directions associated with different resolution levels cover different temporal slope ranges of the candidate directions along said spatial dimension such that the temporal slope range covered by each set associated with a first resolution level is embedded in the temporal slope range covered by any set associated with a second resolution level lower than said first resolution level, and wherein the selector is arranged to eliminate from the directions of regularity candidate directions having an estimated loss value above a threshold, and to select as a direction of regularity each remaining candidate direction of the set associated with a first resolution level higher than a second resolution level if a candidate direction of the set associated with said second resolution level equal or closest to said candidate direction of the set associated with the first resolution level was not eliminated.

22. The device as claimed in claim 19, wherein the spacing between the candidate directions of one of the sets is a decreasing function of the resolution level associated with said set.

23. The device as claimed in claim 18, wherein the interpolation section has a single interpolator for interpolating between pixel values from the representations of frame regions at one resolution level.

24. The device as claimed in claim 13, wherein for at least some directions of regularity, the geometry detection section uses representations of frame regions of the input video sequence at at least one resolution level different from the resolution level of the representations of the frame regions used in the interpolation section for interpolating between pixel values for said directions of regularity.

25. A non-transitory computer-readable medium having a frame rate conversion program stored therein, wherein the frame rate conversion program comprises:

instructions for distributing multiscale coefficients obtained for each frame of an input video sequence into K groups of coefficients, K being a integer greater than 1, whereby a first group of coefficients provides a representation of the frame at a first resolution level and for each integer k such that $1<k \leqq K$, a $k^{th}$ group of coefficients and the representation of the frame at the $(k-1)^{th}$ resolution level determine a representation of the frame at a $k^{th}$ resolution level;

instructions for determining directions of regularity associated with pixels of at least one frame of an output video sequence based on representations of successive frames of the input video sequence at at least one of the resolution levels; and instructions for determining an interpolated pixel value for each pixel of said frame of the output video sequence, the determination of the interpolated pixel value including, for each direction of regularity associated with said pixel, interpolating between pixel values from representations of successive frames of the input video sequence at at least one of the resolution levels;

wherein at least one of the instructions for determining directions of regularity and the instructions for determining an interpolated pixel value is arranged to take into account a direction of regularity using representations of frame regions in the successive frames of the input video sequence at at least one resolution level depending on said direction of regularity, said instructions being executed when said program is run in a computer processing unit.

\* \* \* \* \*